United States Patent
Klehr et al.

(10) Patent No.: US 11,913,578 B2
(45) Date of Patent: Feb. 27, 2024

(54) CONNECTION DEVICE FOR PIPES WITH LEAKAGE INDICATOR

(71) Applicant: VOSS AUTOMOTIVE GMBH, Wipperfürth (DE)

(72) Inventors: Adrian Klehr, Balve (DE); Frank Engelhard, Wermelskirchen (DE); Kazim Canpolat, Dormagen (DE); Harald Hagen, Wipperfürth (DE)

(73) Assignee: VOSS Automotive GmbH, Wipperfurth (DE)

( * ) Notice: Subject to any disclaimer, the term of this patent is extended or adjusted under 35 U.S.C. 154(b) by 428 days.

(21) Appl. No.: 17/276,066

(22) PCT Filed: Jul. 31, 2019

(86) PCT No.: PCT/EP2019/070654
§ 371 (c)(1),
(2) Date: Mar. 12, 2021

(87) PCT Pub. No.: WO2020/052858
PCT Pub. Date: Mar. 19, 2020

(65) Prior Publication Data
US 2022/0049804 A1   Feb. 17, 2022

(30) Foreign Application Priority Data

Sep. 14, 2018   (DE) .................. 10 2018 122 507.5

(51) Int. Cl.
*F16L 37/091* (2006.01)
(52) U.S. Cl.
CPC ....... *F16L 37/0915* (2016.05); *F16L 2201/30* (2013.01)

(58) Field of Classification Search
CPC .............. F16L 37/0915; F16L 37/0982; F16L 2201/30
(Continued)

(56) References Cited

U.S. PATENT DOCUMENTS 7,922,215 B2 * 4/2011 Salomon-Bahls .. F16L 37/0925
285/924
8,196,970 B2   6/2012 Brandt et al.
(Continued)

FOREIGN PATENT DOCUMENTS

DE        19524934 A1    1/1997
DE     202005009575 U1   10/2006
(Continued)

*Primary Examiner* — Aaron M Dunwoody
(74) *Attorney, Agent, or Firm* — Honigman LLP; Eric J. Sosenko; Jonathan P. O'Brien

(57) ABSTRACT

A connecting device having a connecting body with a receiving opening for a pipeline and a retaining element for securing an inserted pipeline. Inside the connecting body is a release element disposed in an axially displaceable manner such that the pipeline can be released. The release element includes a ring part and snap-in arms separated from each other by longitudinal slots. The outer perimeter the ring part can be sealed by an outer perimeter gasket against an interior perimeter wall of the connecting body, and the interior perimeter of the ring part can be sealed by an interior perimeter gasket against the inserted pipeline. In an assembled state of the connecting device, the outer perimeter gasket can be deformed from its sealing position such that at least one leakage gap is formed in the interior of the connecting device by an interior pressure of a pressurized medium in the pipeline.

27 Claims, 6 Drawing Sheets

(58) Field of Classification Search
USPC .......................................... 285/13, 14, 924
See application file for complete search history.

(56) References Cited

U.S. PATENT DOCUMENTS

2015/0240979 A1   8/2015  Hagen et al.
2015/0337998 A1  11/2015  Hagen et al.

FOREIGN PATENT DOCUMENTS

| DE | 202005013691 U1 | 1/2007 |
| DE | 202012102342 U1 | 10/2013 |
| DE | 102012108791 A1 | 3/2014 |
| EP | 0766033 A1 | 4/1997 |
| EP | 0957305 A2 | 11/1999 |
| EP | 2864685 B1 | 4/2015 |

* cited by examiner

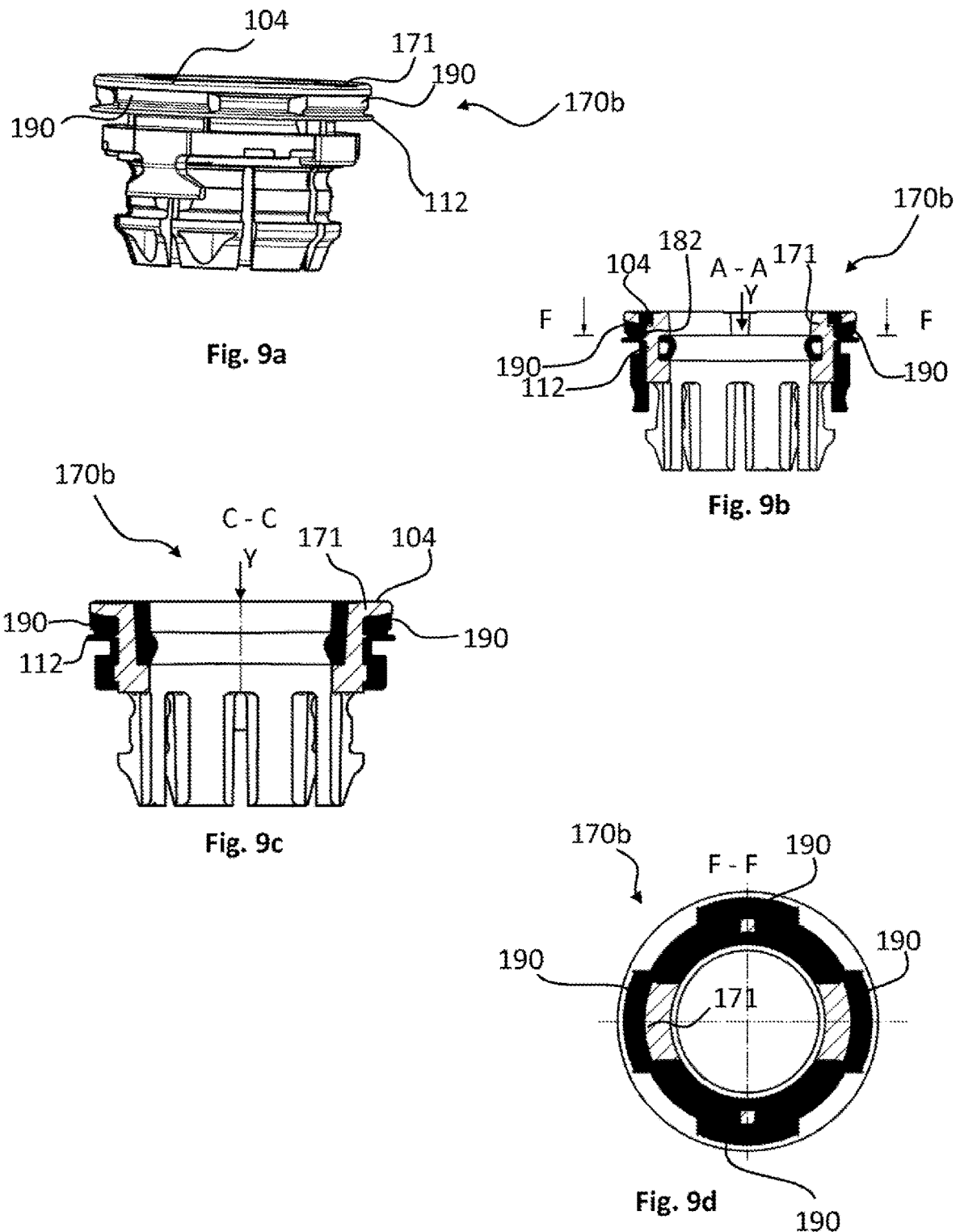

CONNECTION DEVICE FOR PIPES WITH LEAKAGE INDICATOR

BACKGROUND

The invention relates to a connecting device for pipelines with a connecting body with a receiving opening for a pipeline with a line end to be inserted in an insertion direction and a retaining element seated within the receiving opening for securing of the inserted line end from being pulled out, wherein inside of the connecting body there is a casing-shaped release element disposed in an axially displaceable manner such that due to the action on the retaining element, the securing of the inserted pipeline can be terminated, wherein the release element consists of a perimeter-sealed ring part on which snap-in arms separated from each other by longitudinal slots are formed, wherein the ring part can be sealed at its outer perimeter by a perimeter gasket against an interior perimeter wall of the connecting body and can be sealed at its interior perimeter in the region of its ring opening by a perimeter gasket against the inserted pipeline.

A connecting device of this kind is known from EP 2 864 685 A1. The problem arises with this connecting device that there may occur an improper insertion of the pipeline when the pipeline is not fully inserted, and thus the result can be a leakage of the pressurized medium flowing in the pipeline, so that the entire system can fail. The danger present in a connecting device of this kind is also particularly great, since the pipeline is inserted directly, and ultimately it can only be determined using the insertion force whether the pipeline has been inserted up to the stop.

SUMMARY

The object of the invention is to ensure that existing misalignments can be quickly detected at startup, e.g., at the first pressure test.

According to the invention this object is achieved by the features of the characterizing part of claim 1, such that in the assembled state of the connecting device, in the interior perimeter region of the ring part of the release element, the outer perimeter gasket can be deformed from its sealing position such that between the outer perimeter gasket and the opposing, interior perimeter wall of the connecting body, at least one leakage gap is formed in the interior of the connecting device by an interior pressure of the pressurized medium flowing in the pipeline. Accordingly the invention is based on the knowledge that it is possible to create a leakage gap—in the case of an over-pressure generated in the interior space in the vicinity of the gasket—such that the resulting pressure is sufficient to lift the gasket from its sealing position. Thus in the region where the gasket has been lifted, a leakage gap is created from which the pressurized medium, in particular compressed air, can emerge to the outside and a hissing noise will be produced. By perception of the hissing noise, the user can determine that the connecting device is not fully inserted. As soon as the elevated pressure in the interior of the connecting device is no longer present, the gasket will again perform its usual sealing function to the outside, so that in particular no contaminants can enter from the outside into the interior space. In addition, the release element is a materially bonded two-component part composed of the ring part and the perimeter gaskets, wherein the perimeter gaskets are comprised of a more elastic material than the ring part. Thus a faster assembly is possible and also a faster and more economical manufacturing process. In addition, installation reliability is increased due to a reduction in potential faulty assemblies.

According to a further embodiment of the invention, the ring part of the release element includes an outer actuation surface directed opposite to the insertion direction, and in the assembled state its outer perimeter surface rests against the perimeter of the interior perimeter wall of the connecting body, whereby the release element, when viewed in the insertion direction, features a sealing region behind the outer perimeter surface extending axially in the insertion direction and having a reduced diameter of the sealing region. Due to this perimeter gasket, the ring part can be sealed at its outer perimeter against the interior perimeter surface of a connecting body, in particular against contaminants. Due to the radial planar offset, the perimeter gasket is protected against external environmental factors by the actuation surface. In addition, the actuation surface makes it possible for a user to apply a force onto the release element in the insertion direction, so that the release element can be axially displaced.

In particular the outer perimeter gasket consists of a ring-shaped sealing body, and when viewed in the insertion direction features a radially outward pointing sealing lip, wherein the outside diameter of the sealing lip is preferably greater than the inside diameter of the connecting body in the region of its interior perimeter wall. Advantageously the sealing lip of the outer perimeter gasket rests against the perimeter wall of the connecting body such that a perimeter seal against contaminants is ensured, and due to the interior pressure of the pressure medium present in the interior when the pipeline is not fully inserted, a leakage gap forms due to a kinking or bending of the sealing lip. Thus in the event of an over-pressure occurring in the interior space, the leakage gap will be created in the region of the gasket. The pressurized medium, in particular compressed air, can exit to the outside through the resulting leakage gap, so that the hissing noise is produced.

In a further embodiment according to the invention, the interior perimeter gasket includes a ring-shaped sealing body which includes a rounded sealing surface toward the ring opening, wherein the smallest diameter of the sealing surface is preferably smaller than the outside diameter of the pipeline to be inserted. Due to the rounding of the sealing surface, very little assembly force is required.

Advantageously the interior perimeter gasket has a U-shaped perimeter whose opening is directed radially outward, so that the contact and deformation behavior in a static and in a pressure-loaded state and the contact forces of the perimeter gasket with respect to the pipeline can be in widely affected.

According to one preferred embodiment, when viewed in the insertion direction, behind the perimeter gasket at the outer perimeter of the ring part there are at least two, in particular four, lugs which are comprised of the same material as the perimeter gaskets and are connected as a single piece to the perimeter gasket, wherein the lugs are arranged uniformly along the circular perimeter of the ring part at a uniform perimeter spacing to each other, wherein in the assembled state, the surface of the lugs facing away from the ring part is pressed at least in part radially against a conically tapered surface of the connecting body and causes a restoring force acting opposite to the insertion direction. In particular, there are two lugs offset by 180° arranged at the outer perimeter of the ring part, particularly preferred are four lugs offset by 90° arranged on the outer perimeter of the ring part.

A further possible embodiment consists in that anvils extending axially in the insertion direction are molded onto at least two lugs, wherein the anvils include a front side directed in the insertion direction, which in the assembled state are pressed against a front wall of a bearing element directed opposite the insertion direction. The anvils are braced against the bearing element and produce a pretension which has a reactive force on the release element. In order to influence the pretension forces, the anvils feature a perimeter surface directed toward the conically tapered surface of the connecting body; particularly this perimeter surface includes a concave shaped surface. In this regard, and to improve the contact behavior, the anvils can have a broadened perimeter especially in the insertion direction.

In addition, the connecting body is an axial, two-part housing in the insertion direction, with a first housing part pointing in the insertion direction, and a second, sleeve-shaped housing part featuring an opening side of the receiving opening, wherein the housing parts can be connected together.

In a further advantageous embodiment, the outer perimeter opening of the release element features one or more partial regions reinforced in the axial direction. The reinforcement in the axial direction prevents and/or makes more difficult the opening of the sealing lip in this region. Advantageously with this design the flow volume can be adjusted in case of a leak. Adjusting of the leakage volume is advantageous so that despite incomplete insertion, it can still be assured that the leakage volume can be reliably replenished, for example, by a compressor.

Further advantageous embodiments of the invention are presented in the following description of Figures and in the dependent claims.

BRIEF DESCRIPTION OF THE DRAWINGS

FIG. 9a shows a perspective view of a third embodiment of a release element of a connecting device according to the invention, FIG. 9b shows a longitudinal cross-section A-A according to FIG. 3 through the third embodiment of an inventive release element according to FIG. 9a, FIG. 9c shows a longitudinal cross-section C-C according to FIG. 3 through the third embodiment of an inventive release element according to FIG. 9a, and FIG. 9d shows a cross-section F-F through the embodiment according to FIG. 9b.

The same parts in the various Figures are always denoted by the same reference numbers.

DETAILED DESCRIPTION

With regard to the following description it is stressed that the invention is not limited to the exemplary embodiments and not to all or a plurality of features of described feature combinations, rather each individual partial feature of the exemplary embodiment is also of importance to the subject matter of the invention, even detached from all other partial features described in connection therewith, and also in combination with any features of different exemplary embodiment.

Figure 1:
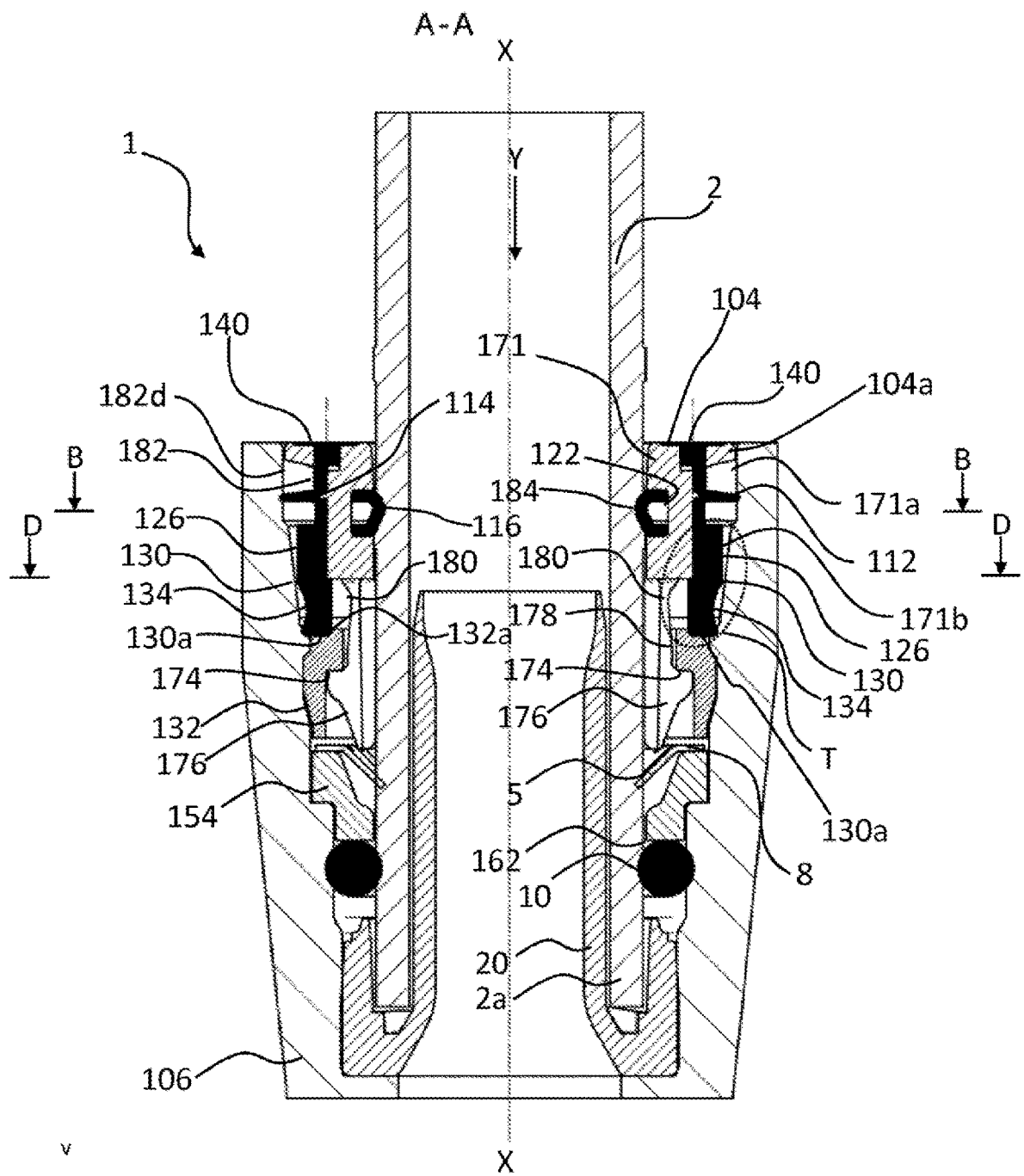
FIG. 1 shows a longitudinal cross section A-A according to FIG. 3 through a first embodiment of a connecting device according to the invention with fully inserted pipeline.
Figure 2:
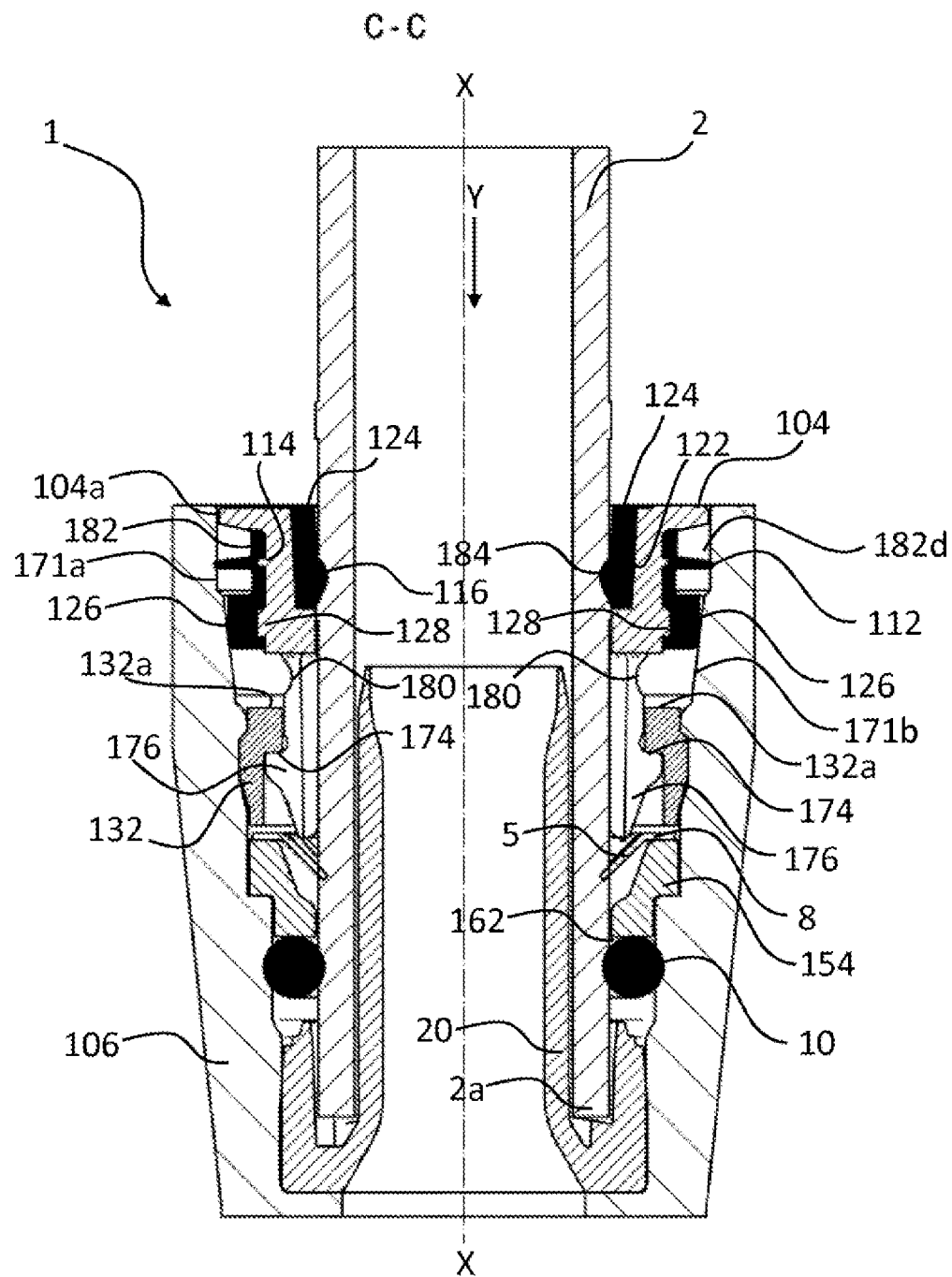
FIG. 2 shows a longitudinal cross section C-C according to FIG. 3 through the first embodiment of a connecting device according to the invention with fully inserted pipeline.
Figure 3:
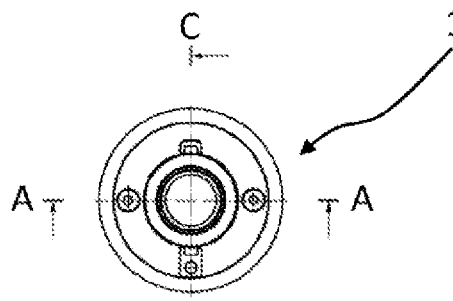
FIG. 3 shows a top view in the insertion direction of the first embodiment of a connecting device according to the invention with inserted pipeline.

In FIGS. 1 to 3 a connecting device 1 is depicted according to the invention for fast and also detachable connecting of a pipeline 2 by a simple insertion of a line end 2a into a receiving opening of a connecting body 106. The insertion direction Y is indicated by an arrow in each of FIGS. 1 and 2. Thus since no connection spindle is present for attaching of the pipeline 2, this design can also be referred to as a "spindle-less plug system." For locking of the inserted line end 2a against pulling-out, a retaining element 5 is seated inside the receiving opening; this retaining element is designed in particular as a spring-elastic toothed ring with an outer perimeter region 8 and with a plurality of retaining teeth. These retaining teeth are arranged along the perimeter, extend radially inward and at a slant in the insertion direction Y and thus act in a hook-like friction-fit or interference-fit manner against the outer perimeter surface of the line end 2a. For external sealing of the inserted pipeline 2, in addition at least one perimeter gasket 10 is seated inside of the connection body 106, which externally seals a ring gap formed radially between the line end 2a and the connection body 106.

The outer perimeter region 8 of the retaining ring 5 in the non-deformed state rests in a plane perpendicular to the longitudinal axis X-X of the connection device 1, whereas the retaining teeth are aligned in a conical perimeter due to their slanting position. Due to their interior retaining hooks the retaining teeth define a perimeter whose diameter in the non-deformed state is less than the outer diameter of the pipeline 2. Thus the retaining hooks apply a radial retaining force in particular in an interference-fit or at least friction-interference-fit manner against the outer perimeter of the inserted line end 2a.

The retaining ring 5 is seated in particular by its outer perimeter region 8 with a defined and limited axial and radial clearance inside of the connecting body 106. This axial and radial free clearance is limited by axial and opposing contact sections within the connecting body 106. Advantageously the retaining ring 5 can be better centered to the line being inserted due to the axial and radial free clearance. In addition, the retaining ring 5 at the angular transition between the outer perimeter region 8 and the retaining teeth cooperates with a perimeter tipping edge within the connecting body 106 at the radial interior perimeter of the radial contact surface forming the first contact section, such that upon insertion of the line end 2a through its contact with the retaining teeth of the retaining ring 5, it is pressed by its outer perimeter region 8 against the first, lower contact section and is pivoted wiper-like about the tipping edge, until the outer perimeter region 8 moves radially outward into a braced contact with the second, axially opposing, upper contact section. Then proceeding from this position, if the line end 2a is additionally moved in the insertion direction Y, an elastic flexure deformation occurs essentially only in the region of the retaining teeth extending radially inward over the tipping edge. The insertion process is then completed in that the line end 2a is pulled back somewhat against the insertion direction Y. Thus the retaining teeth cut into the outer perimeter of the line end 2a in an interference-fit or at least friction-interference-fit manner.

Advantageously inside the receiving opening of the connecting body 106 there is a support sleeve 20 arranged in a coaxial manner such that the line end 2a can be pushed onto a cylindrical outer surface of the support sleeve 20 during the insertion process. Thus the inserted line end 2a is radially braced by the support sleeve 20, so that when under stress with a radial retaining force applied by the retaining ring 5, deformations of the pipeline 2 in the action-area of the retaining ring 5 are prevented.

The tipping edge for the retaining ring 5 described above can be formed advantageously on an insertion ring 154, which preferably also features the first contact section in the shape of a radially outward front surface perpendicular to the longitudinal axis X-X adjoining the tipping edge. Thus the tipping edge is formed at the transition between the front surface forming the first contact section and an internal conical adjoining surface.

The insertion of the insertion ring 154 into the connecting body 106 is implemented in particular as a transition fit. In this case the invention provides that the front surface of the insertion ring 154 within the connecting body 106 pointing in the insertion direction, together with a flank surface of the connection body 106 positioned axially opposite thereto, bounds a sealing chamber 162 for the pipe perimeter gasket 10. The perimeter gasket 10 likewise pertains preferably to an O-ring which js advantageously comprised of EPDM (ethylene propylene diene monomer) or NBR (nitrile butadiene rubber=nitrile rubber) for applications in compressed air pipelines, and of a fluorine elastomer for applications in fuel pipelines.

The insertion ring 154 advantageously disconnects the installation areas for the retaining element 5 firstly, and the sealing element 10 secondly. Especially in combination with the support sleeve 20, eccentricities and ovalities in the pipeline 2 in the region between gaskets and retainers can be prevented or compensated. Preferably the insertion ring 54 is comprised of a plastic, in particular POM or without fiberglass reinforcement, PBT or PA6.6, optionally with a fiberglass percentage of GF 30%. Alternatively the insertion ring 54 can also consist of metal, especially aluminum.

A sleeve-like release element 170 is provided for releasing of the inserted pipeline 2 secured by means of the retaining ring 5. This release element 170 engages in an axially displaceable manner into the connecting body 106 such that by an insertion of the release element 170 in the insertion direction Y, the retaining ring 5 is elastically deformable in the region of the retaining teeth to release the line end 2a. In this case the actuation sections of the release element 170 act against the retaining ring 5, for example, against the retaining teeth.

Preferably the release element 170 is held inside the connecting body 106 against disassembly by a snap-in 174. The release element 170 herein features on its end pointing in the insertion direction Y, snap-in arms 176 spaced apart by axial slots whose one ends are molded onto the ring part 171 closed along the perimeter, and their radial outward pointing snap in hubs engage behind a radial stepped surface 178 (see FIGS. 1 and 2), wherein this stepped surface 178 is formed by a sleeve-shaped bearing element 132. In particular, the bearing position of the bearing element 132 is secured inside of the connecting body. As illustrated in FIGS. 1 and 2, the bearing element 132 is disposed at axial height radially between the connecting body 106 and the snap-in arms 176. For locking of the bearing element 132, the connecting body 106 features in the region of the bearing element 132 a perimeter groove with an enlarged diameter, wherein the diameter of the groove in the insertion direction Y is reduced conically back to the diameter in the region of the insertion ring 154. The bearing element 132 features a body whose leading basic body in the insertion direction Y represents a stepped surface 178 for the snap-in arms 176; furthermore the body of the bearing element 132 extends in the insertion direction Y such that together with a surface directed in the insertion direction Y it defines the contact surface for the retaining element 5, in particular for the outer perimeter region 8. In particular, the bearing element 132 forms a groove between the contact surface for the retaining element 5 and the insertion ring 154, wherein the retaining element 5 is seated, in particular in a slightly radial and axial-displaceable manner. Advantageously the bearing element 132 holds the snap-in arms 176 of the release element 170, so that the release element 170 cannot fall out from the connecting body 106 axially against the insertion direction Y.

In another advantageous embodiment, the snap-in arms 176 are connected to the perimeter enclosed ring part 171 of the release element 170 by hinge-like tapered sections 180, so that the radial mobility of the snap-in arms 176 is improved for the assembly of the release element 170 into the bearing element 132.

In addition, in the region of the ring part 171, the release element 170 firstly features an outer perimeter gasket 182 and secondly, an interior perimeter gasket 184. The outer perimeter gasket 182 acts to seal a ring gap between the ring part 171 of the casing-like release element 170 and the connecting body 106. The interior perimeter gasket 184 seals a ring gap between the ring part 171 and the line end 2a.

Figure 4:
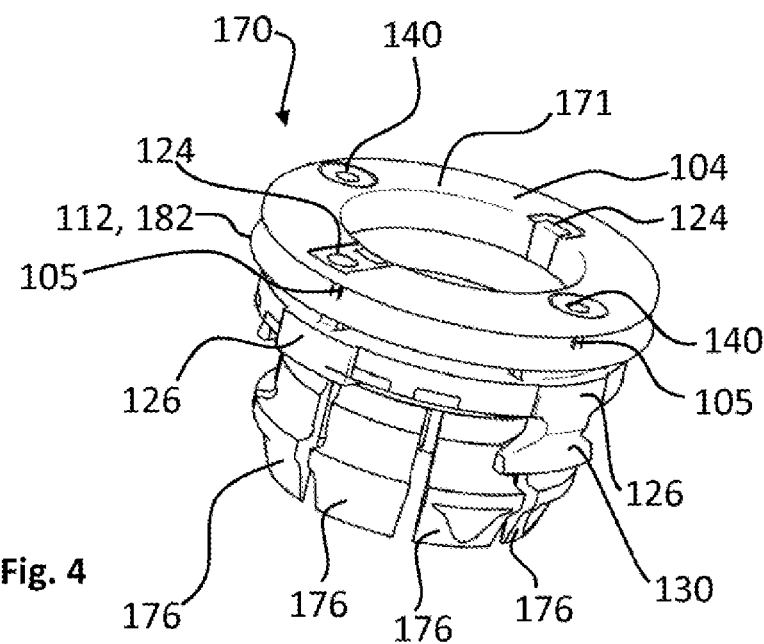
FIG. 4 shows a perspective view of a release element of the first embodiment of a connecting device according to the invention.

According to this embodiment, as it is depicted in FIGS. 1 to 3, the release element 170 is a materially bonded two-component part composed of the ring part 171 and the perimeter gaskets 182, 184, wherein the perimeter gaskets 182, 184 are comprised of a more elastic material than the ring part 171; in FIGS. 1 and 2 the two components are indicated by a differing contrast. A release element of this kind detached from the connecting device 1 is illustrated in FIGS. 3 and 4.

It is also advantageous if the release element 170 includes an outer actuation surface 104 directed opposite to the insertion direction Y. The ring part 171 in the assembled state can rest by an outer perimeter surface 104a against the perimeter of the interior perimeter wall 171a of the connecting body 106. The ring part herein, as is illustrated in FIGS. 1 and 2, when viewed in the insertion direction Y features a sealing region 182d behind the outer perimeter surface 104a extending axially in the insertion direction Y and having a reduced diameter of the sealing region 182d, in which the perimeter gasket 182 is disposed.

In the sense of the invention, the outer perimeter gasket 182 consists of a ring-shaped sealing body, and when viewed in the insertion direction Y features a radially outward pointing sealing lip 112, wherein the outside diameter of the sealing lip 112 is preferably greater than the inside diameter of the connecting body 106 in the region of its interior perimeter wall 171a. In particular the sealing lip can extend perpendicular to the insertion direction Y radially in the direction of the interior perimeter wall 171a of the connection body, wherein the interior perimeter wall 171a can be cylindrically shaped entirely or partly in the region of the sealing lip.

As is illustrated in FIG. 1, for example, the sealing lip 112 of the outer perimeter gasket 182 rests against the perimeter wall 171a of the connecting body 106 such that due to the interior pressure of the pressure medium present in the interior when the pipeline 2 is not fully inserted, the leakage gap forms due to a kinking or bending of the sealing lip 112. In particular while the leakage gap is forming, the sealing lip 112 kinks in such a manner that due to the escaping medium, an acoustic signal will be perceptible for the user. In addition, this is a repeatable process; as soon as the interior pressure is again in a "normal" state, the sealing lip 112 will resume its sealing position.

Advantageously the sealing lip 112 can be affected when the ring part 171—when viewed in the insertion direction Y—includes a perimeter rib 114 at the axial height of the sealing lip, which rib extends radially into the sealing lip 112. As is illustrated in FIGS. 1 and 2, this rib 114 acts advantageously such that the sealing lip 112 is displaced little or not at all relative to the ring part 171.

Figure 6:
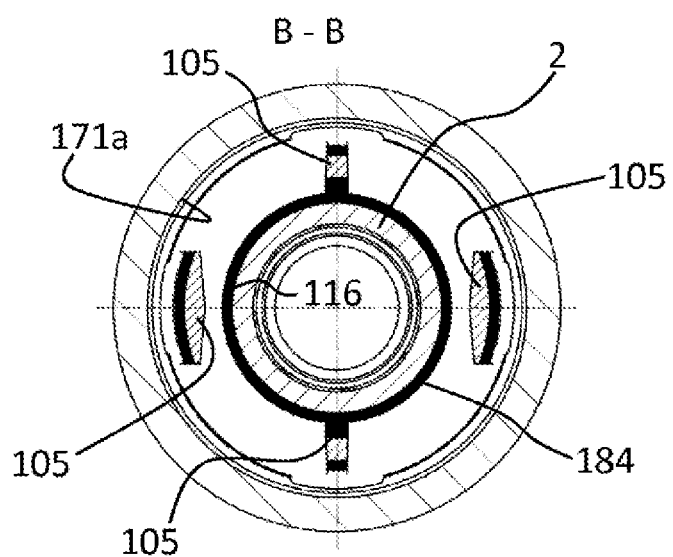
FIG. 6 shows a cross-section B-B through the embodiment according to FIG. 1 with inserted pipeline.

An additional advantageous embodiment in the sense of the invention is present when the interior perimeter gasket 184 includes a ring-shaped sealing body which has a rounded sealing surface 116 towards the ring opening. As illustrated in FIGS. 1 and 2, this sealing surface 116 is dimensioned such that the smallest diameter of the sealing surface 116 is advantageously smaller than the outer diameter of the pipeline 2 being inserted. Preferably the ring part 171 of the release element 170 features a perimeter gap 122 open toward the pipeline 2 being inserted and the perimeter gasket 184 is disposed in this gap. According to another advantageous embodiment, the release element 170 includes two axial component sections, one upper section which includes the actuating surface 104 and one lower section on which the snap-in arms 176 in particular are formed, wherein the component sections are connected together by connecting bridges 105 and the interior perimeter gasket 184 is connected both to the upper, and also to the lower section. Advantageously the ring part 171 is a single part consisting of the upper section, the connecting bridges 105 and the lower section. In FIG. 6 the cross section B-B according to FIG. 1 passes through the connecting bridges 105. The interior perimeter gasket 184 in particular is created in a U-shape between the upper and the lower sections and is opened pointing radially outward. Due to the U-shaped, radially outward-pointing, opened perimeter gasket 184, the assembly and/or application is improved due to an improved contact behavior on a line to be connected. In addition, the release element 170 is inherently more flexible and can compensate for stresses occurring during operation.

In another preferred embodiment, the connecting bridges 105, as depicted in particular in FIG. 6, are four connecting bridges 105, arranged mutually opposite one another on a common perimeter relative to the receiving opening. In this particular case it can be an advantage that the U-shaped profile of the interior perimeter gasket 184 is interrupted in particular solely in the region of one or of several of the connecting bridges 105, in such a manner that the perimeter gasket 184 completely fills only the interstice between the connecting bridge 105 and the sealing surface 116. In the preferred embodiment, as is depicted in FIG. 6, the U-shaped profile of the interior perimeter gasket 184 is interrupted at two locations and is completely filled, wherein the release element 170 overall features four connecting bridges 105. The arrangement of the connecting bridges 105 enables a particularly simple deformation, without the use of cross slides in the production of the release element 170. According to the invention, in the placement of the connecting webs 105, the number and width of the local reinforcements are kept as small as possible, thus in particular the design according to FIG. 6 features advantageously only two partial fillings, which each are only as wide as one connecting bridge 105. The minimum embodiment of the reinforcements is an advantageous compromise between the sealing effect and the manufacturing expense. A deformation behind the bridges 105 signifies a large expense, whereas a small size of the reinforcements has only a minimal adverse effect on the sealing. Alternatively, if the connecting bridges 105 are offset by one web width, then advantageously the in particular U-shaped, interior perimeter gasket 184 can be opened pointing radially outward, without significantly increasing the production expense, so that the sealing effect is optimized.

An additional preferred embodiment provides that the outer perimeter gasket 182 and the interior perimeter gasket 184 are connected together as a single piece, in particular axially between the component sections.

In order to improve the connection between the ring part 171 and the perimeter gasket 184, especially with a two-component design of the release element 170, the ring part 171—as illustrated in FIG. 4—can feature open, partially distributed notches 124 across its interior perimeter to the receiving opening. The notches 124 are advantageously filled by the interior perimeter gasket 184. It turns out that a qualitatively favorable connection of the ring part 171 to the interior perimeter gasket 184 is obtained when the notches 124—when viewed in the insertion direction Y—begin at the front surface of the ring part 171 of the release element 170, and end in particular between the upper section of the ring part 171 and the lower section of the ring part 171.

According to one advantageous variant of the connection device 1, as is illustrated in FIGS. 1 to 3, when viewed in the insertion direction Y, the connecting device 1 includes a release element 170 for which at least two, in particular four lugs 126 are arranged behind the perimeter gasket 182 at the outer perimeter of the ring part 171. These lugs are made of the same material as the outer perimeter gasket 182 and the interior perimeter gasket 184 and are joined as a single piece to the perimeter gasket 182. It is desirable that the lugs 126 be distributed uniformly along the circular perimeter of the ring part 171, at a uniform perimeter distance from each other. In particular, there are two lugs 126 offset by 180° arranged at the outer perimeter of the ring part, particularly preferred—as depicted in FIGS. 1 to 3—there are four lugs 126 offset by 90° arranged on the outer perimeter of the ring part. In the assembled state the surfaces of the lugs 126 pointing away from the ring part 171 are pressed at least partly radially against a conically tapered surface 171b of the connecting body 106. Due to this embodiment, the outer perimeter gasket 182 is no longer needed to effect a favorable restoring force opposite the insertion direction Y, so that the outer perimeter gasket 182, in particular the sealing lip 112, is relieved. In accordance with this embodiment, the restoring force is created by the at least partial pressing of the surface of the lugs 126 against the conically tapered surface 171b of the connection body 106, and in this regard it is expedient that the lugs 126 are made of the same elastic material as the outer perimeter gasket 182. An additional advantageous effect is that the lugs 126 can be shaped with the perimeter gasket in one manufacturing process.

In order to improve the connection between the ring part 171 and lug 126 at the locations of the lugs 126, the ring part 171 can feature in particular one or a plurality of anchors 128 which—when viewed in the insertion direction Y—are arranged at the axial height of the lugs 126 and each extend radially into a lug 126. As illustrated in FIG. 2, one anchor 128 each extends into one lug 126, wherein the anchor 128 is entirely enclosed by the particular lug 126. In the illustrated exemplary embodiment according to FIG. 8, two lugs 126 each include one anchor 128, see section C-C, FIG. 2, and two lugs 126 feature no anchor 128, see section A-A, FIG. 1.

An expanded embodiment of the lugs 126 indicates that anvils 130 extending axially in the insertion direction Y are molded in particular onto at least two lugs 126. The anvils 130 feature a front side 130a directed in the insertion direction Y, which in the assembled state are pressed in particular against a front wall 132a of a bearing element 132 directed opposite the insertion direction Y. This embodiment makes it possible that with the locking of the release element 170, that is, with the assembly in the connecting body 106, the anvils 130 exert in particular a restoring force acting against the insertion direction Y. In particular, an axial displacement in the insertion direction Y of the release element 170 and synergistically also a line removal is prevented.

FIGS. 1 and 4 depict one advantageous design of the anvils 130. The anvils 130, as depicted, can feature a perimeter surface 134 directed toward the conically tapered surface 171b of the connecting body 106; this perimeter surface has a concave shaped surface. In addition the illustrations indicate that the perimeter of the anvils 130 can broaden out increasingly in the insertion direction Y. Due to the concave surface of the anvils, the deformation of the anvils during pressing and/or during assembly is influenced and a volume created for a material of the anvil 130, which is filled by the anvil 130 during pressing. Due to the broadened perimeter surface of the anvils 130, the front side 130a directed in the insertion direction Y features an enlarged surface area; in particular when pressing against the front wall 132a of the bearing element 132, the force is exerted by the anvils 130 uniformly onto the bearing element 132. Thus advantageously the anvil is shielded against lateral displacement under pressure.

Figures 7A, 7B:
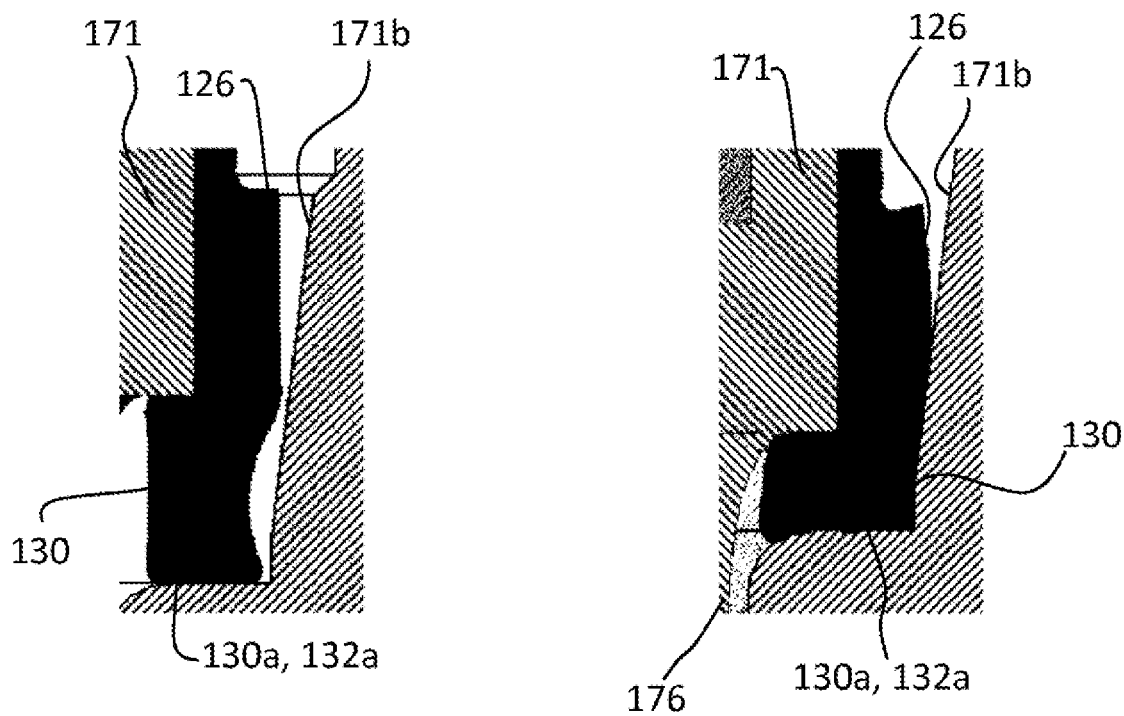
FIG. 7a shows an enlarged depiction of the detail T in FIG. 1.
FIG. 7b shows an enlarged depiction of the detail in the region T in FIG. 6 during a release process according to the invention.

FIGS. 7a and 7b demonstrably illustrate a pressing process according to the invention. FIGS. 7a and 7b illustrate how the ring part 171 features snap-in arms 176, a lug 126 and an overmolded anvil 130. It is quite visible therein how the lug 126 and/or the anvil 130 in the pressed position (see 7b) is pressed against the conical surface of the connecting body 106, and how the front side 130a is pressed against the front side 132a. In addition, it is also evident how the free space created by compression of the concave shape is filled by the material of the anvil 130.

Figure 5:
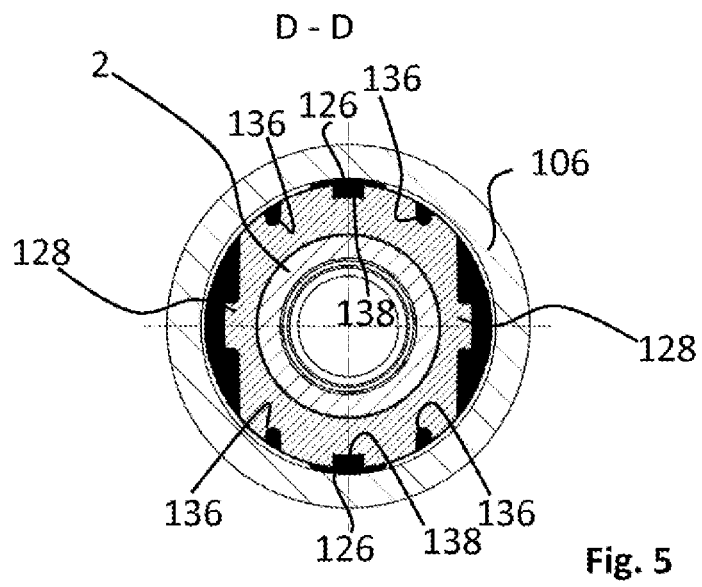
FIG. 5 shows a cross-section D-D through the embodiment according to FIG. 1 with inserted pipeline.

FIG. 5 presents a cross section through a connection device 1 according to the invention, like that depicted in FIG. 1. FIG. 5 illustrates one particular potential improvement with respect to the connection of the interior perimeter gasket 184 and the ring part 171, and also of the outer perimeter gasket 184 and the ring part 171. As is illustrated, when viewed in the insertion direction Y, grooves 136 are notched in the ring part 171, each between the lug 126 and anchor 128 above the anvils 130; these grooves are filled by the outer perimeter gasket 182. Lug grooves 138 which are notched in the ring part 171 above the anvils 130, and which are filled by the outer perimeter gasket 182, perform the same objective of improved connection between the outer and interior perimeter gasket 182, 184 with the ring part 171.

For the purpose of an improved connection of the same parts, the ring part 171, as illustrated in FIG. 1, includes at least one passage 140, in particular in the actuation surface 104. Advantageously this leads into the sealing region 182d, wherein the passage 140 is filled by the outer perimeter gasket 182. In another advantageous embodiment, the passages 140 are aligned such that they lead in particular into the sealing area(s) 182d above a lug 126, as described above.

FIGS. 8a to 8d depict a second preferred embodiment of the release element 170a. The embodiment is mounted in particular in a connecting body 106 as described for the first embodiment, wherein the release element 170a is essentially identical to the release element 170 according to the embodiment depicted in FIGS. 1 to 7b, and differs solely by the design of the sealing regions 182d and the structure of the outer perimeter gasket 182.

Figure 8A:
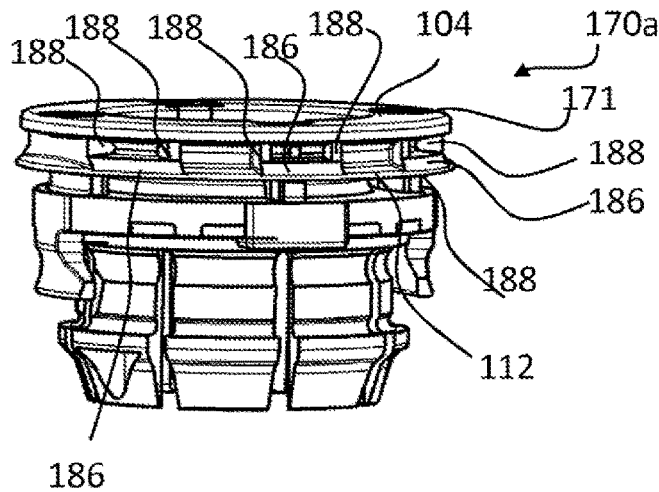
FIG. 8a shows a perspective view of a second embodiment of a release element of a connecting device according to the invention.
Figure 8B:
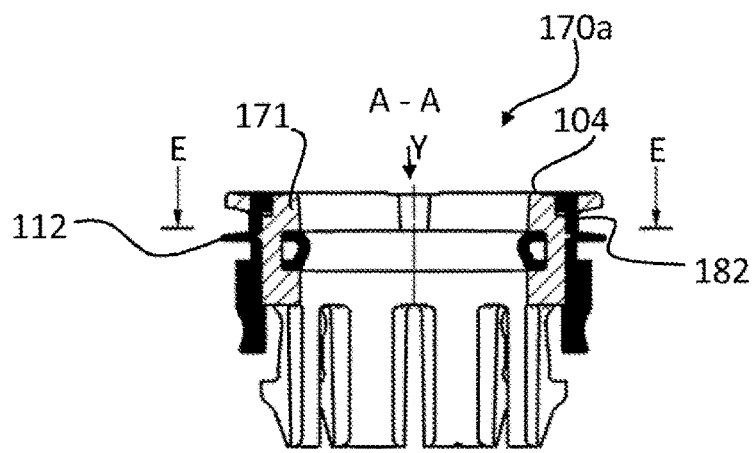
FIG. 8b shows a longitudinal cross-section A-A according to FIG. 3 through the second embodiment of an inventive release element according to FIG. 8a, FIG. 8c shows a longitudinal cross section C-C according to FIG. 3 through the second embodiment of an inventive release element according to FIG. 8a, FIG. 8d shows a cross-section E-E through the embodiment according to FIG. 8b.
Figure 8C:
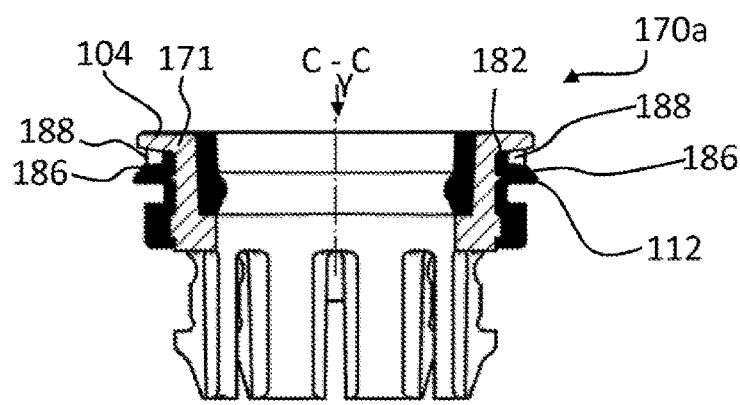
Figure 8D:
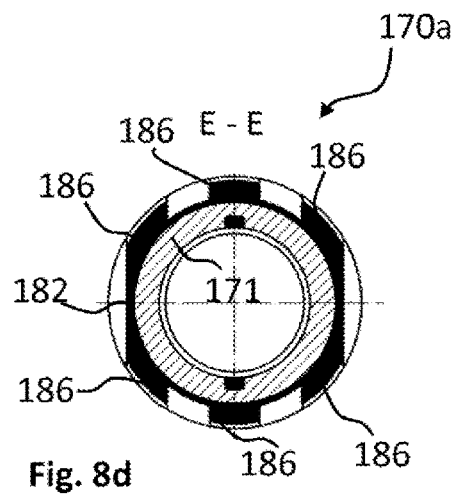

Advantageously the outer perimeter gasket 182, preferably the radially outward pointing sealing lip 112, of the release element 170a includes in particular one or more overmolded, partial thickenings 186, which extend in particular into the sealing region 182d opposite to the insertion direction Y, and are braced against the ring part 171 preferably on the back side of the actuation surface 104 by overmolded brace ribs 188. They prevent the opening of the sealing lip in this region. Advantageously with this design the flow volume can be adjusted in case of a leak. An adjustment of the leakage volume is necessary so that a connector does not adversely affect the operation, e.g. of a passenger vehicle, despite incomplete insertion. This means, for example, that a compressor can resupply the leakage volume in spite of the leak, and thus the function of the brakes, for example, is still ensured. Depending on the size of the bracing, the flow volume can be adapted for different sizes. The organization to six regions, as depicted in FIG. 8d, is advantageous, since under a one-side load, the other sealing lips are always in a position to open up.

FIGS. 9a to 9d depict a third advantageous embodiment of the release element 170b. This embodiment is assembled in particular in a connecting body 106, as described for the first and second embodiment, wherein the release element 170b is essentially identical to the release element 170, 170a according to the embodiments illustrated in FIGS. 1 to 8d, and differs solely from the design of the sealing regions 182d and the structure of the outer perimeter gasket 182.

Preferably the design of the release element 170b, like the release element 170a depicted in FIGS. 8a to 8d, can adjust the flow volume in case of leakage, wherein the necessity and the advantage as indicated in the description of the second embodiment of the release element 170a, are identical to the third embodiment of the release element 170b.

Preferably the outer perimeter gasket 182, advantageously the radially outward pointing sealing lip 112, of the release element 170b features in particular one or a plurality of overmolded, partial bulges 190, which extend in particular into the sealing region 182*d* opposite to the insertion direction Y, preferably out to the back side of the actuation surface 104 to the ring part 171 and rest against the ring part 171 or are connected to the ring part 171. These bulges 190 prevent the opening of the sealing lip in this region. The size of the bulges 190 can be adapted depending on the setting of the flow volume in case of a leak. Preferably the organization is into four regions, as depicted in FIG. 9*d*, since under a one-sided load, the other sealing lips are always in a position to open up.

Although it is not depicted, one embodiment of the connecting device 1 according to the invention, as is illustrated in FIGS. 1 to 3, can comprise a connecting body 106 which comprises an axial, two-part housing in the insertion direction Y, with a first housing part pointing in the insertion direction Y, and a second, sleeve-shaped housing part featuring an opening side of the receiving opening, wherein the housing parts can be connected together.

The invention is not limited to the illustrated and described embodiments, but rather encompasses also all designs which are equivalent in the sense of the invention. It is expressly emphasized that the exemplary embodiments are not limited to all features in combination, rather, each individual partial feature can by itself also have inventive significance even detached from all other partial features. Furthermore, the invention is also not limited to the combination of features defined in claim 1, but rather can also be defined by any other particular combination of particular features of all the disclosed individual features. This means that basically virtually each individual feature of claim 1 can be omitted and/or replaced by at least one individual feature disclosed elsewhere in the application.

The invention claimed is:

1. A connecting device for pipelines, the connecting device comprising: a connecting body with a receiving opening for a pipeline with a line end to be inserted in an insertion direction and a retaining ring seated inside the receiving opening for securing of the inserted line end against withdrawal, wherein inside of the connecting body there is a sleeve-shaped release element seated in an axially displaceable manner such that due to an action on the retaining ring, the securing of the inserted pipeline is terminated, in which by an insertion of the release element in the insertion direction, the retaining ring is elastically deformable in the region of retaining teeth to release the line end in which actuation sections of the release element act against the retaining ring, wherein the release element includes a ring part on which snap-in arms separated from each other by longitudinal slots are formed, wherein the ring part is perimeter sealed and defines a ring opening and can be sealed at an outer perimeter by an outer perimeter gasket against an interior perimeter wall of the connecting body and can be sealed at an interior perimeter in the region of the ring opening by an interior perimeter gasket against the inserted pipeline, wherein in an assembled state of the connecting device, in the interior perimeter region of the ring part of the release element, the outer perimeter gasket can be deformed from a sealing position such that between the outer perimeter gasket and the opposing, interior perimeter wall of the connecting body, at least one leakage gap is formed in the interior of the connecting device by an interior pressure of the pressurized medium flowing in the pipeline, and the release element is a materially bonded two-component part composed of the ring part and the outer and interior perimeter gaskets, wherein the outer and interior perimeter gaskets being formed of a more elastic material than the ring part.

2. The connecting device according to claim 1, wherein the ring part of the release element includes an outer actuation surface directed opposite to the insertion direction, and in the assembled state an outer perimeter surface of the ring part rests against the perimeter of the interior perimeter wall of the connecting body, such that the release element, when viewed in the insertion direction includes a sealing region behind the outer perimeter surface extending axially in the insertion direction and having a reduced diameter of the sealing region, wherein the outer perimeter gasket is disposed.

3. The connecting device according to claim 2, wherein the release element includes two axial component sections, one component section being an upper section which includes the actuating surface and the other component section being a lower section on which the snap-in arms are formed, wherein the component sections are connected together by connecting bridges and the interior perimeter gasket is connected both to the upper section and also to the lower section.

4. The connecting device according to claim 3, wherein the interior perimeter gasket is created in a U-shaped profile between the upper and the lower sections and is opened pointing radially outward.

5. The connecting device according to claim 4, wherein the U-shaped profile of the interior perimeter gasket is interrupted solely in a region of one or of several of the connecting bridges, in such a manner that the interior perimeter gasket completely fills only an interstice between the connecting bridge and the sealing surface.

6. The connecting device according to claim 3, wherein the ring part is a single part including the upper section, the connecting bridges and the lower section.

7. The connecting device according to claim 3, wherein the ring part features along the interior perimeter toward the receiving opening, open, partially distributed notches, which begin at a front surface of the ring part of the release element when viewed in the insertion direction and end between the upper section of the ring part and the lower section of the ring part, wherein the interior perimeter gasket fills the notches.

8. The connecting device according to claim 4, wherein the connecting bridges are arranged at an offset of one web width and the U-shaped profile of the interior perimeter gasket is opened pointing radially outward.

9. The connecting device according to claim 2, wherein the ring part of the release element includes at least one opening in the actuation surface, which leads into the sealing region, wherein the opening is filled by the outer perimeter gasket.

10. The connecting device according to claim 9, wherein the openings are aligned and lead into the sealing region above a lug provided behind the outer perimeter gasket at the outer perimeter of the ring part.

11. The connecting device according to claim 1, wherein the outer perimeter gasket is a ring-shaped sealing body, and when viewed in the insertion direction includes a radially outward pointing sealing lip, wherein an outside diameter of the sealing lip is greater than an inside diameter of the connecting body in the region of the interior perimeter wall.

12. The connecting device according to claim 11, wherein the sealing lip of the outer perimeter gasket rests against the interior perimeter wall of the connecting body such that due to the interior pressure of the pressure medium present in the interior when the pipeline is not fully inserted, the leakage gap forms due to a kinking or bending of the sealing lip.

13. The connecting device according to claim 11, wherein the ring part when viewed in the insertion direction, includes a rib at an axial height of the sealing lip and this rib extends radially into the sealing lip.

14. The connecting device according to claim 1, wherein the interior perimeter gasket includes a ring-shaped sealing body which features a rounded sealing surface toward the ring opening, wherein a smallest diameter of the sealing surface is smaller than an outside diameter of the pipeline to be inserted.

15. The connecting device according to claim 1, wherein the outer perimeter gasket and the interior perimeter gasket are connected together as a single piece.

16. The connecting device according to claim 1, wherein the ring part of the release element features a perimeter gap open toward the pipeline being inserted and the interior perimeter gasket is disposed in this perimeter gap.

17. The connecting device according to claim 1, wherein when viewed in the insertion direction, behind the outer perimeter gasket at the outer perimeter of the ring part there are at least two lugs which consist of the same material as the outer and interior perimeter gaskets and are connected as a single piece to the outer perimeter gasket, wherein the lugs are arranged uniformly along the perimeter of the ring part at a uniform perimeter spacing to each other, wherein in the assembled state, a surface of the lugs facing away from the ring part is pressed at least in part radially against a conically tapered surface of the connecting body and causes a restoring force acting opposite to the insertion direction.

18. The connecting device according to claim 17, wherein the ring part features one or a plurality of anchors which when viewed in the insertion direction are arranged at an axial height of the lugs and each extend radially into a lug, wherein the anchor is fully enclosed by the particular lug.

19. The connecting device according to claim 17, wherein anvils extending axially in the insertion direction are molded onto at least two lugs, wherein the anvils feature a front side directed in the insertion direction, which in the assembled state are pressed against a front wall of a bearing element directed opposite the insertion direction.

20. The connecting device according to claim 19, wherein the anvils feature a perimeter surface directed toward the conically tapered surface of the connecting body, this perimeter surface features a concave shaped surface.

21. The connecting device according to claim 19, wherein the perimeter of the anvils broadens out increasingly in the insertion direction.

22. The connecting device according to claim 19, wherein when viewed in the insertion direction, grooves are notched in the ring part, each between the lug and anchor above the anvils; these grooves are filled by the outer perimeter gasket.

23. The connecting device according to claim 19, wherein in the ring part above the anvils, lug grooves are notched which are filled by the outer perimeter gasket.

24. The connecting device according to claim 1, wherein the outer perimeter gasket of the release element includes one or a plurality of partial regions reinforced in the axial direction.

25. The connecting device according to claim 1, wherein the outer perimeter gasket of the release element includes one or a plurality of molded on, partial thickenings, which extend opposite to the insertion direction and are braced against the ring part by overmolded brace ribs.

26. The connecting device according to claim 1, wherein the outer perimeter gasket of the release element includes one or a plurality of overmolded, partial bulges, which extend opposite to the insertion direction out to the ring part and rest against the ring part or are connected to the ring part.

27. The connecting device according to claim 1, wherein the connecting body is an axial, two-part housing in the insertion direction, with a first housing part pointing in the insertion direction, and a second, casing-shaped housing part having an aperture side of the receiving opening, wherein the housing parts can be connected together.

* * * * *